Feb. 7, 1956 K. S. PALMER 2,733,942
HANDLE ATTACHMENT MEANS
Filed April 29, 1953
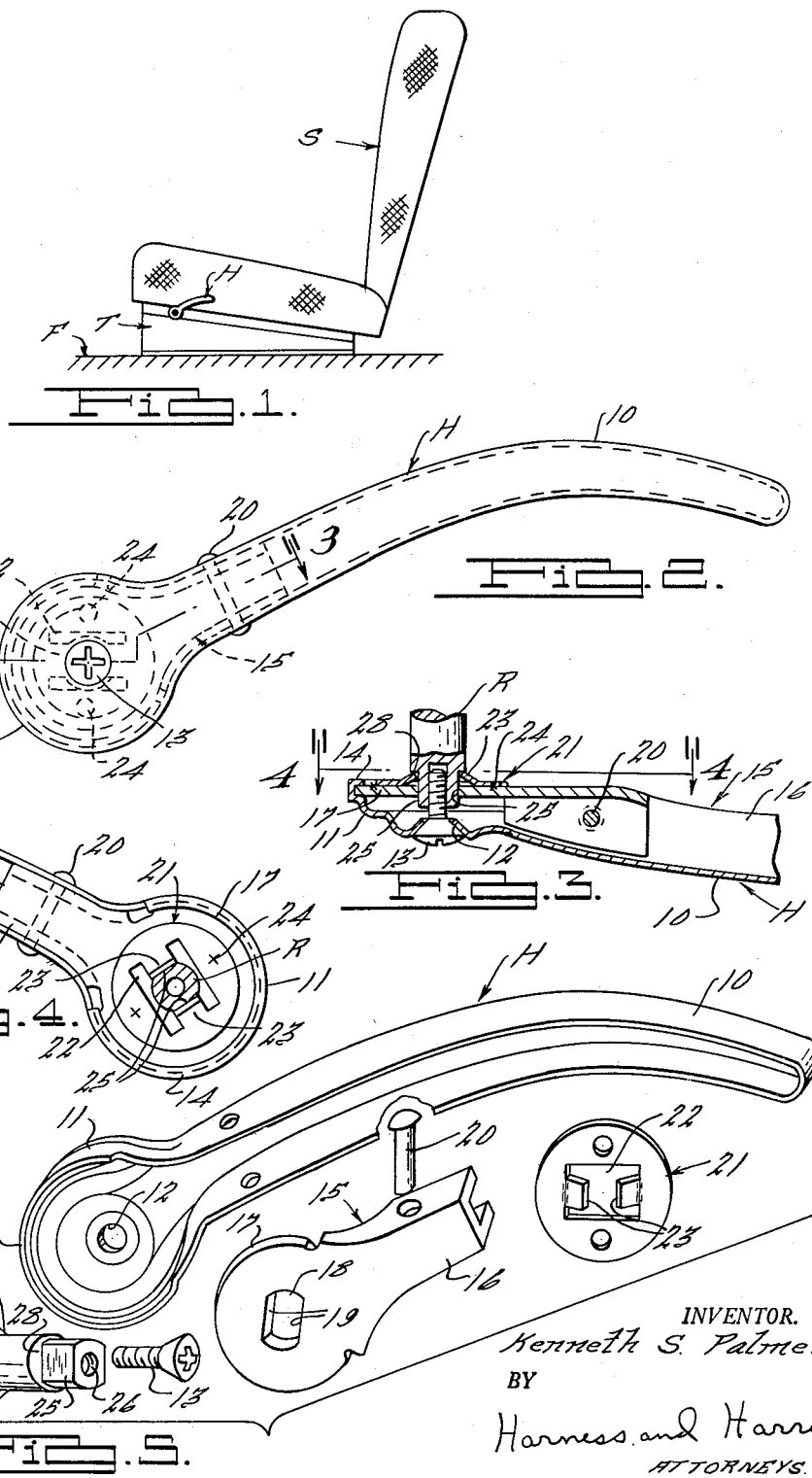
INVENTOR.
Kenneth S. Palmer.
BY
Harness and Harris
ATTORNEYS.

United States Patent Office 2,733,942
Patented Feb. 7, 1956

2,733,942

HANDLE ATTACHMENT MEANS

Kenneth S. Palmer, Detroit, Mich., assignor to Chrysler Corporation, Highland Park, Mich., a corporation of Delaware Application April 29, 1953, Serial No. 351,901

5 Claims. (Cl. 287—53)

This invention relates to handles or levers and particularly to the attachment means for detachably connecting the handles or levers to a member adapted to be operated by or to support the handle or lever.

It is a primary object of this invention to provide a handle or lever attaching means that includes means to readily take up the looseness or play between the handle and its supporting member in the normal process of mounting the handle or lever on its supporting or handle operated member.

It is a further object of this invention to provide a simple, low cost handle or lever having reinforced mounting portions that include means that may be readily deformed during attachment of the handle or lever to its supporting member such that a rigid connection between the handle or lever and its supporting member may be initially achieved continuously retained.

Other objects and advantages of this invention will be readily apparent from a reading of the following description and a consideration of the related drawings wherein:

Fig. 1 is a side elevation of a motor vehicle seat structure that includes a seat slide mechanism having a control handle embodying this invention;

Fig. 2 is an enlarged top plan elevation of the handle unit embodying this invention;

Fig. 3 is a fragmentary, sectional elevational view taken along the line 3—3 of Fig. 2;

Fig. 4 is a fragmentary bottom plan view of the hub portions of the handle unit, this view being taken along the line 4—4 of Fig. 3; and Fig. 5 is an exploded view of the handle and attachment means therefor, the view being taken looking at the bottom or underside of the handle unit.

Fig. 1 of the drawings shows a seat assembly S that could represent the front seat of a motor vehicle. As is customary, the seat unit S is mounted on the vehicle floor F by means of trackways T that permit the seat assembly S to be adjustably shifted longitudinally of the vehicle. Latch mechanism (not shown) is associated with the seat assembly S and the trackways T so that the seat assembly S may be selectively anchored in a plurality of different adjusted positions. The aforementioned latch mechanism (not shown) is controlled by a latch lever or handle H that is fixedly mounted on a rotatably mounted control rod R. In the adjustment of the seat S, the handle H is grasped and swung counterclockwise so as to release the latch mechanism (not shown) associated with the seat trackways T. Thereafter the seat assembly S may be shifted to its desired position and then the handle H moved clockwise to latch the seat assembly S in its adjusted position.

Looking at Figs. 2–5, it will be noted that the handle H comprises a stamped, channel-like, lever portion 10 that has an enlarged, cup-like hub portion 11 formed integrally therewith at one end thereof. The cup-like hub portion 11 is pierced by an axially extending aperture 12 that is adapted to receive a handle mounting screw connector 13.

Formed to nest within the underside of the handle H is a torque transmitting handle reinforcing member 15. Reinforcing member 15 includes a channel-shaped stem portion 16 that is adapted to nest within the underside of the handle lever portion 10. Formed integrally with the channel-shaped stem 16 of member 15, at one end thereof, is a perforated disc portion 17. Disc portion 17 is adapted to fit within and cover the open side of the cup-like hub portion 11 of the handle H. The periphery of the handle hub portion 11 is formed with a marginal portion 14 that provides a step-like seat to receive the disc portion 17 of the torque transmitting reinforcing member 15.

After the reinforcing member 15 is mounted by the rivet 20 in the underside of the handle element H, with the disc portion 17 of the reinforcing member 15 covering the top of the handle cup-like portion 11, then the marginal portion 14 of the cup-like handle hub portion 11 is rolled over to lock the disc portion 17 in assembled position. An aperture 18 pierces the center of the disc portion 17 and this aperture 18 has a pair of opposite flat sides 19 adapted to engage the flat sided handle supporting shaft or rod R.

Seated on the outer or exposed side of the reinforcing member disc portion 17 is a washer member 21. Washer 21 is formed with a substantially rectangularly shaped opening 22 into which project a pair of oppositely disposed, substantially radially extending, angularly deflected, flexible prongs 23. The prongs 23 extend upwardly or are raised or offset at an angle to the outer surface of the washer 21 as clearly shown in Fig. 3. The washer 21 is fixedly mounted on the disc portion 17 of the reinforcing member 15 by a pair of spot welds 24 or some similar form of attachment. The opening 22 in washer 21 is aligned with the opening 18 in the reinforcing member disc portion 17 and with the aperture 12 in the handle hub portion 11. It will be noted that the free, flat ends of the washer prongs 23 are aligned with the flat sides 19 of the opening 18 in the disc portion 17 of the reinforcing member 15. The prongs 23 could be formed integrally with the disc portion 17 of the reinforcing member 15 rather than as parts of a separate washer 21.

With the handle H assembled as shown in Figs. 2–4, it is thought to be clear that such a handle or lever can be quickly and rigidly connected to the flat-sided end of a shaft or rod R. The shaft or rod R has a pair of oppositely disposed flat sides 25 formed on it adjacent its free end portion. The inner ends of the flat sides 25 of the rod end terminate in shoulders 28 that provide reaction means against which the washer prongs 23 may bear. Rod or shaft R is also formed with an axially extending internal bore 26 adapted to receive the handle anchoring screw connector 13.

When the flat-sided end of the stepped or shouldered rod or shaft R is inserted through the aligned openings 22, 18 in the superimposed handle portions 21, 17, then the flat sides 25 of the rod or shaft R are engaged by the flat sides 19 of the disc portion 17 and by the flat ends of the washer prongs 23. Obviously the handle H cannot rotate on the rod or shaft R nor move axially inwardly on rod R beyond the rod shoulders 28. When the screw 13 is passed through the opening 12 in the handle hub portion 11 and threaded into the bore 26 in the end of the rod or shaft R, then the handle H will be forced axially inwardly along the rod or shaft R into engagement with the shoulders 28. This axial movement of the handle H along the end of the rod or shaft R by the screw 13 tends to flatten out the prongs 23 of the washer 21 and wedge these prongs 23 against the flat sides 25 of the end of the rod or shaft R. Accordingly, the mere tightening of the screw 13 in the rod or shaft bore 26 takes up any looseness in the handle to rod connection and assures a tight, rigid connection at all times. The opening 12 in handle H has a countersunk formation to matingly receive the head of the screw 13.

It will be seen that there is herein disclosed a simple, strong, low cost handle having novel means for insuring a rigid, torque transmitting connection at all times. Not only are all handle parts, other than screw 13, simple stampings, but in addition, the wedge prongs 23 insure a rigid handle attachment at all times after initial installation and furthermore the automatic clearance take-up connection is one that permits the handle to be readily detached from the associated handle supporting rod or shaft R.

I claim:

1. A handle adapted to be detachably connected to the stepped portion of a handle supporting member that includes a non-circular portion adjacent said stepped portion, said handle comprising a hub portion with an aperture extending axially therethrough, a torque transmitting member carried by the handle hub portion having a non-circular opening therein aligned with the hub portion aperture, said non-circular opening being shaped to receive and to non-rotatably engage the non-circular portion of the handle supporting member adjacent the step thereon, deformable means carried by the torque transmitting member comprising angularly deflected, opposed, spaced prongs adapted to be wedgingly engaged with the step in the handle supporting member during axial movement of the handle along its supporting member in one direction, and connector means adapted to extend axially through the aperture in the handle hub portion and through the non-circular opening in the torque transmitting member and to positively engage the handle supporting member and urge said handle axially of said handle supporting member in said one direction to cause said deformable means to engage the stepped portion of the handle supporting member and to rigidly connect the handle to the handle supporting member.

2. A handle adapted to be detachably connected to a shouldered, non-circular, portion of a handle supporting member, said handle comprising a hub portion with an aperture extending axially therethrough adapted to receive the reduced part of said shouldered, non-circular, handle supporting member, a torque transmitting member carried by the handle hub portion having means to non-rotatably engage the non-circular portion of the handle supporting member, washer means having deformable, substantially radially extending, angularly deflected, prongs carried by the torque transmitting member, said washer prongs being arranged to be wedgingly engaged with the handle supporting member shoulder during axial movement of the handle along its supporting member in one direction, and connector means adapted to extend axially through the aperture in the handle hub portion and to positively engage the handle supporting member and to urge said handle axially of said handle supporting member in said one direction to force said washer prongs into rigid connection with the shoulder of the handle supporting member.

3. A handle adapted to be detachably connected to a shouldered, non-circular, portion of a handle supporting member, said handle comprising a hub portion with an aperture extending axially therethrough adapted to receive the reduced part of said shouldered, non-circular, handle supporting member, a torque transmitting portion on the handle hub portion having means to non-rotatably engage the non-circular portion of the handle supporting member, means mounted on said hub portion aligned with the hub aperture providing a pair of angularly deflected, substantially radially extending prongs that are adapted to be wedgingly engaged with the shoulder of the handle supporting member during axial movement of the handle along its supporting member in one direction, said handle supporting member including screw receiving means, and a screw mounted in the handle aperture and engageable with said screw receiving means of the supporting member to provide means for positively anchoring said handle on said handle supporting member and for progressively moving said handle axially along said handle supporting member in said one direction to cause said washer prongs to be engaged with and deformed by said handle supporting member shouldered portion to rigidly and non-rotatably connect the handle supporting member, said screw means further providing a progressive wear take-up means for the connection between the handle and its supporting member.

4. A handle adapted to be detachably connected to a shouldered non-circular portion of a handle supporting member, said handle comprising a stamped member having a channel-shaped lever arm portion and an integrally formed, cup-shaped, axially pierced, hub portion that is formed on one end of said lever arm portion, a handle reinforcing member comprising a leg portion nested in the lever arm portion of said stamped member having a connected, perforated, disc portion on one end of said leg portion, said disc portion being arranged to cover the open end of said cup-shaped hub portion of the stamped member with the perforation thereof being of non-circular shape and aligned with the axially directed opening in the lever hub portion and arranged to non-rotatably engage the shouldered non-circular portion of the handle supporting member, and deformable means mounted on said reinforcing member disc portion comprising spaced apart, substantially radially extending, angularly offset, opposite disposed prongs axially aligned with the perforation in the disc portion of said reinforcing member, said prongs providing means to rigidly engage the shoulder of the handle supporting member and screw member and screw fastener means to detachably fasten said handle to its supporting member and urge said prongs against the shoulder of the supporting member so as to deform the prongs into mating engagement with the shouldered, non-circular portion of the handle supporting member.

5. In combination with a handle supporting member having a stepped non-circular portion providing a shoulder to receive a handle, a handle comprising a member having a lever arm portion and an integrally formed, cup-shaped, hub portion that is pierced by an axially extending opening, a handle reinforcing member comprising a perforated, disc mounted on and arranged to cover the open end of the handle cup-shaped hub portion, said disc perforation being non-circular and aligned with the axially extending opening in the handle hub portion and arranged to non-rotatably engage the non-circular portions of the handle supporting member, said reinforcing member disc portion having mounted thereon spaced apart, substantially radially extending, angularly deflected, oppositely disposed, deformable prongs that are axially aligned with the perforation in the disc reinforcing member, and screw means arranged to extend through the axially directed opening in the handle hub portion and the perforation in the disc and to be engaged with mating threaded means on the handle supporting member to provide a means to positively connect the handle to a handle supporting member and to progressively force the prongs on said washer element into wedging, rigid, engagement with the shoulder on the handle supporting member.

References Cited in the file of this patent

UNITED STATES PATENTS

| | | |
|---|---|---|
| 1,589,525 | Freysinger | June 22, 1926 |
| 1,611,549 | Moore | Dec. 21, 1926 |
| 2,128,729 | Murphy | Aug. 30, 1938 |
| 2,290,056 | Koubeck | July 14, 1942 |
| 2,374,270 | Brock | Apr. 24, 1945 |

FOREIGN PATENTS

| | | |
|---|---|---|
| 703,633 | France | Feb. 10, 1931 |